United States Patent
Gershman et al.

(10) Patent No.: US 10,341,273 B2
(45) Date of Patent: Jul. 2, 2019

(54) COORDINATION OF DATA RECEIVED FROM ONE OR MORE SOURCES OVER ONE OR MORE CHANNELS INTO A SINGLE CONTEXT

(71) Applicant: III HOLDINGS 2, LLC, Wilmington, DE (US)

(72) Inventors: Greg Gershman, Baltimore, MD (US); Michael J. Miller, Germantown, MD (US); George Dardamanis, Cockeysville, MD (US)

(73) Assignee: III HOLDINGS 2, LLC, Wilmington, DE (US)

( * ) Notice: Subject to any disclaimer, the term of this patent is extended or adjusted under 35 U.S.C. 154(b) by 0 days.

(21) Appl. No.: 14/740,428

(22) Filed: Jun. 16, 2015

(65) Prior Publication Data

US 2015/0288631 A1 Oct. 8, 2015

Related U.S. Application Data

(63) Continuation of application No. 12/007,949, filed on Jan. 17, 2008, now Pat. No. 9,081,844, and a
(Continued)

(51) Int. Cl.
| | |
|---|---|
| *H04L 12/58* | (2006.01) |
| *H04L 29/08* | (2006.01) |
| *G06F 16/27* | (2019.01) |
| *H04L 29/06* | (2006.01) |
| *H04W 4/14* | (2009.01) |

(52) U.S. Cl.
CPC .......... *H04L 51/066* (2013.01); *G06F 16/278* (2019.01); *H04L 51/32* (2013.01); *H04L 67/14* (2013.01); *H04L 67/20* (2013.01); *H04L 67/42* (2013.01); *H04W 4/14* (2013.01)

(58) Field of Classification Search
CPC ....... H04L 67/14; H04L 67/20; H04L 51/066; H04L 51/32; H04L 67/42; H04W 4/14; G06F 17/30584
See application file for complete search history.

(56) References Cited

U.S. PATENT DOCUMENTS

| | | | |
|---|---|---|---|
| 5,721,817 | A | 2/1998 | Kurihara et al. |
| 5,860,073 | A | 1/1999 | Ferrel et al. |
| (Continued) | | | |

FOREIGN PATENT DOCUMENTS

| | | |
|---|---|---|
| CA | 2335445 A1 | 8/2002 |
| WO | 9750002 A1 | 12/1997 |
| (Continued) | | |

*Primary Examiner* — Michael C Lai
(74) *Attorney, Agent, or Firm* — Brundidge & Stanger, P.C.

(57) ABSTRACT

A middleware messaging system is connected between user devices and content providers possibly through one or more networks. The middleware messaging system includes a coordination manager for coordinating partial messages transmitted between the user devices and the content providers. Partial messages received by the middleware messaging system from one or more sources through one or more channels. Partial messages that are associated with each other comprise a single context and as such are coordinated and transmitted to one or more destinations through one or more channels.

20 Claims, 2 Drawing Sheets

Related U.S. Application Data continuation of application No. 10/265,740, filed on Oct. 8, 2002, now Pat. No. 7,426,535.

(56) References Cited

U.S. PATENT DOCUMENTS

| | | | |
|---|---|---|---|
| 5,899,975 A | 5/1999 | Nielsen et al. | |
| 5,905,773 A * | 5/1999 | Wong | H04M 1/271 379/88.03 |
| 5,960,337 A * | 9/1999 | Brewster | A61K 31/02 342/386 |
| 5,970,391 A * | 10/1999 | Eaton | H04W 88/023 455/503 |
| 6,041,357 A | 3/2000 | Kunzelman et al. | |
| 6,085,247 A | 7/2000 | Parsons et al. | |
| 6,169,515 B1 * | 1/2001 | Mannings | G01C 21/34 342/357.31 |
| 6,182,116 B1 | 1/2001 | Namma et al. | |
| 6,199,107 B1 | 3/2001 | Dujari et al. | |
| 6,223,289 B1 | 4/2001 | Wall et al. | |
| 6,230,173 B1 | 5/2001 | Ferrel et al. | |
| 6,269,336 B1 * | 7/2001 | Ladd | H04M 3/42204 379/88.13 |
| 6,338,082 B1 * | 1/2002 | Schneider | H04L 29/12594 709/203 |
| 6,366,934 B1 | 4/2002 | Cheng et al. | |
| 6,397,246 B1 | 5/2002 | Wolfe et al. | |
| 6,397,259 B1 | 5/2002 | Lincke et al. | |
| 6,430,624 B1 | 8/2002 | Jamtgaard et al. | |
| 6,519,643 B1 | 2/2003 | Foulkes et al. | |
| 6,578,056 B1 * | 6/2003 | Lamburt | G06F 17/30557 707/999.007 |
| 6,601,101 B1 | 7/2003 | Lee et al. | |
| 6,601,108 B1 | 7/2003 | Marmor et al. | |
| 6,654,796 B1 * | 11/2003 | Slater | H04L 41/0273 709/201 |
| 6,788,949 B1 | 9/2004 | Bansal et al. | |
| 6,804,372 B1 | 10/2004 | Kondo et al. | |
| 6,826,613 B1 | 11/2004 | Wang et al. | |
| 6,871,213 B1 | 3/2005 | Graham et al. | |
| 6,877,036 B1 * | 4/2005 | Smith | H04L 69/16 709/202 |
| 6,877,095 B1 | 4/2005 | Allen et al. | |
| 6,894,984 B2 * | 5/2005 | Wastlhuber | G05B 19/042 370/252 |
| 6,925,307 B1 | 8/2005 | Mamdani et al. | |
| 6,937,869 B1 * | 8/2005 | Rayburn | G01C 21/20 340/990 |
| 6,950,058 B1 * | 9/2005 | Davis | G01S 19/05 342/357.42 |
| 6,954,751 B2 | 10/2005 | Christfort et al. | |
| 6,973,505 B1 * | 12/2005 | Schneider | G06F 17/30887 707/E17.115 |
| 6,983,370 B2 | 1/2006 | Eaton et al. | |
| 6,988,126 B2 | 1/2006 | Wilcock et al. | |
| 7,043,255 B1 * | 5/2006 | Tiwari | H04W 8/18 455/456.1 |
| 7,072,987 B2 | 7/2006 | Jurisch et al. | |
| 7,099,946 B2 | 8/2006 | Lennon et al. | |
| 7,191,245 B2 * | 3/2007 | Takayama | G08C 15/00 707/999.104 |
| 7,324,556 B2 * | 1/2008 | Hoff | H04W 76/028 370/328 |
| 7,426,535 B2 * | 9/2008 | Gershman | G06F 17/30584 707/E17.005 |
| 7,487,248 B2 | 2/2009 | Moran et al. | |
| 7,818,664 B2 | 10/2010 | Gordon et al. | |
| 7,925,432 B2 * | 4/2011 | Odinak | G01C 21/3629 701/420 |
| 2001/0005809 A1 * | 6/2001 | Ito | G01C 21/3415 701/411 |
| 2001/0036835 A1 | 11/2001 | Leedom et al. | |
| 2001/0056354 A1 | 12/2001 | Feit et al. | |
| 2002/0002599 A1 * | 1/2002 | Arner | G06F 9/4445 709/219 |
| 2002/0002602 A1 * | 1/2002 | Vange | G06F 9/5027 709/219 |
| 2002/0010716 A1 | 1/2002 | McCartney et al. | |
| 2002/0029089 A1 | 3/2002 | Ueda et al. | |
| 2002/0049790 A1 | 4/2002 | Ricker et al. | |
| 2002/0059425 A1 | 5/2002 | Belfiore et al. | |
| 2002/0065064 A1 | 5/2002 | Griffith et al. | |
| 2002/0095582 A1 * | 7/2002 | Peled | G06F 21/10 713/180 |
| 2002/0110097 A1 * | 8/2002 | Sugirtharaj | H04W 28/20 370/329 |
| 2002/0143971 A1 | 10/2002 | Govindarajan et al. | |
| 2002/0169539 A1 * | 11/2002 | Menard | B60K 31/0008 701/96 |
| 2002/0178342 A1 | 11/2002 | Noguchi et al. | |
| 2003/0158897 A1 | 8/2003 | Ben-Natan et al. | |
| 2005/0272443 A1 * | 12/2005 | Hose | G08G 1/207 455/456.1 |
| 2007/0201622 A1 | 8/2007 | Croak et al. | |
| 2007/0266176 A1 | 11/2007 | Wu et al. | |
| 2008/0178072 A1 | 7/2008 | Fiedorowicz et al. | |
| 2010/0268773 A1 | 10/2010 | Hunt et al. | |

FOREIGN PATENT DOCUMENTS

| | | | |
|---|---|---|---|
| WO | WO 9750002 | * | 12/1997 |
| WO | 02065331 A2 | | 8/2002 |

* cited by examiner

COORDINATION OF DATA RECEIVED FROM ONE OR MORE SOURCES OVER ONE OR MORE CHANNELS INTO A SINGLE CONTEXT

CROSS REFERENCE TO RELATED APPLICATIONS

This Application is a Continuation of U.S. Ser. No. 12/007,949, now U.S. Pat. No. 9,081,844, filed on Jan. 17, 2008, which is a continuation of U.S. Ser. No. 10/265,740, filed on Oct. 8, 2002, now U.S. Pat. No. 7,426,535, the entireties of which are expressly incorporated by reference.

FIELD OF THE INVENTION

The invention is generally related to computer networks. More particularly, the invention is related to data coordination.

BACKGROUND OF THE INVENTION

In today's information age, a user may use one or more devices to retrieve desired information. For example, a user may use a cellular phone, personal digital assistant, lap top, etc., to retrieve information from a content provider over one or more networks. These devices may include multimodal applications that receive/transmit information through one or more channels (i.e., paths on which signals may flow). For example, an application may transmit voice on one channel, text on another channel, images on another channel, etc.

Different requests may also travel on different channels. On the other hand, an application may transmit both voice and data on the same channel.

Regardless of the number of channels, these multimodal applications exemplify the requirement of coordinated input from one or more devices. For example, a user may input part of a single request through a first modality, and the rest through a second modality.

Without a system to recognize that these request fragments contribute to a single request (i.e., the input is not coordinated), it is not possible to correctly service the request. Therefore, regardless of whether fragments of a request, fragments of a response, fragments from a "front-end," or fragments from a "back-end" are received, coordination of the fragments into a single context allows for the proper servicing of the data composed from the fragments.

SUMMARY OF THE INVENTION

An embodiment of the invention includes a method for coordinating data from one or more sources. The method comprises steps of receiving data; determining whether the received data is partial data, wherein partial data includes data to be coordinated with other received data (i.e., partial data is a fragment of the complete data); and coordinating the received data with associated data in response to the received data being partial data. The associated data may be received before or after the received partial data.

Another embodiment of the invention includes a method of coordinating data received from one or more sources through one or more channels. The data includes data being transmitted to one or more destinations. The method comprises steps of receiving the data; determining whether the received data is partial data, wherein partial data includes data to be coordinated with other received data (i.e., partial data is a fragment of the complete data); and coordinating the received data with associated data in response to the received data being partial data. The associated data may be received before or after the received partial data.

Yet another embodiment of the invention includes a system comprising a plurality of user devices connected to a plurality of content providers through one or more networks. Messages transmitted between the plurality of user devices and the plurality of contents providers are received by a coordination manager. The coordination manager coordinates the messages that are associated with each other such that the coordinated messages are combined into a single message (i.e., context).

The methods of the present invention include steps that may be performed by computer-executable instructions executing on a computer-readable medium.

Those skilled in the art will appreciate these and other aspects of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
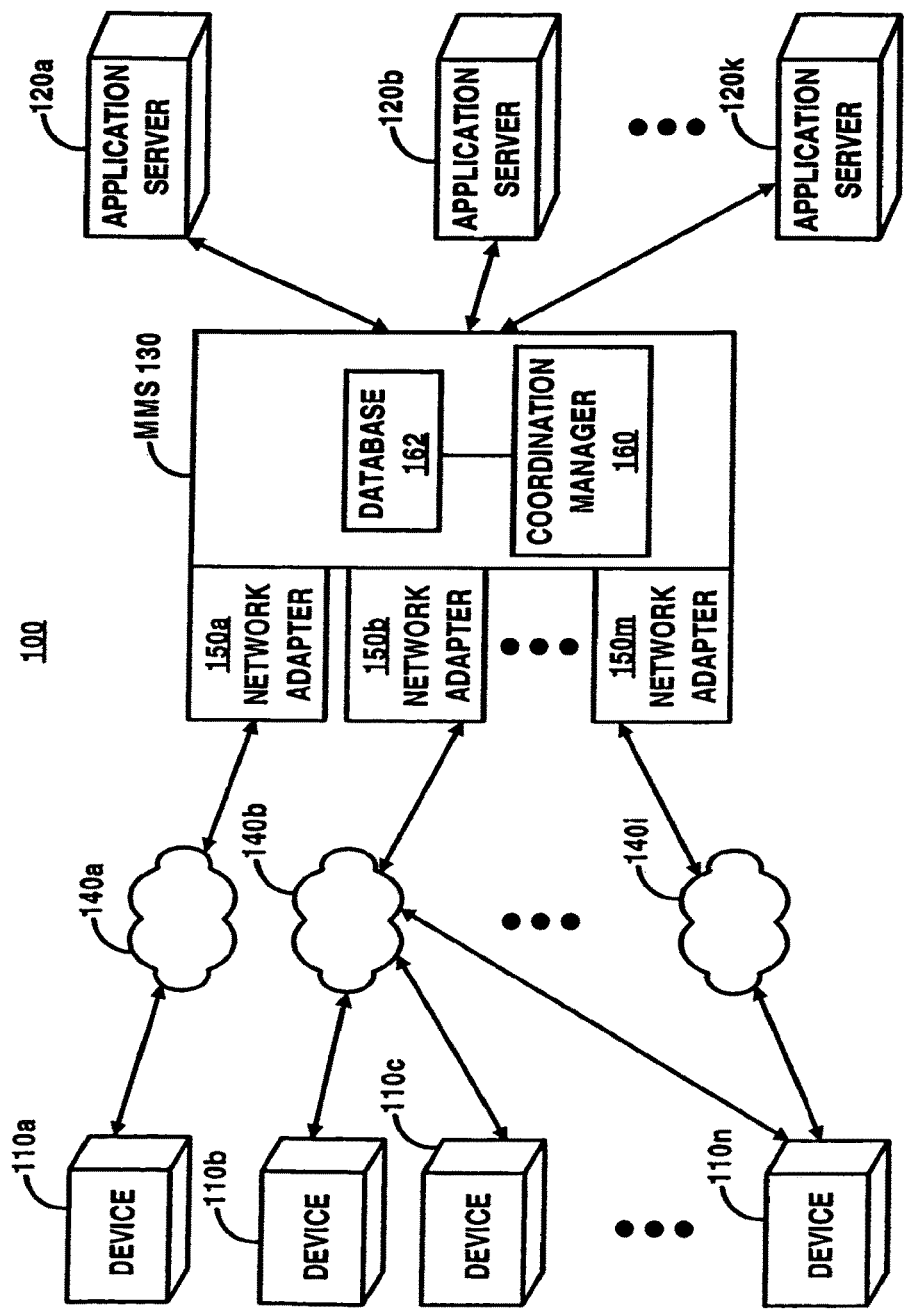
FIG. 1 illustrates a block-diagram of an exemplary system according to an embodiment of the invention.

FIG. 1 illustrates an exemplary system 100 according to an embodiment of the invention. A plurality of user devices 110a . . . n are connected to application servers 120a . . . k through a middleware messaging system (MMS) 130. The user devices 110a . . . n may include any conventional computing device, such as a laptop, personal computer (PC), work station, PDA, cellular phone, wired phone, pocket PC, e-mail retrieval device, etc. The user devices 110a . . . n may transmit requests for data via one or more networks, such as networks 140a . . . i, to the MMS 130. The networks 140a . . . i may include wired or wireless networks using one or more protocols to transmit data. Network adaptors 150a . . . m connected to the MMS 130 include ports for receiving/transmitting data. The network adaptors 150a . . . m may support different protocols to accommodate the different networks 140a . . . i. The application servers 120a . . . k may be directly connected to the MMS. 130 or connected through one or more networks, which may include the networks 140a . . . i. The application servers 120a . . . k provide content to the user devices 110a . . . n. For example, data may be transmitted to the user device 110a from the application servers 120a and 120b via the MMS 130 in response to a user request for data. The MMS 130 may include conventional means for receiving data from the application servers 120a . . . k.

The MMS 130 includes a coordination manager 160 for coordinating data from one or more sources. The coordination manager 160 coordinates data that may be received from one or more devices on one or more channels. For example, data received from one or more user devices (e.g., user devices 110a and/or 110b) may be coordinated; data received from one or more servers (e.g., application servers 120a and/or 120b) may be coordinated; and data received from a user device and a server may be coordinated (e.g., user device 110 and application sever 120a). The data may be received on one or more channels.

The data to be coordinated is data comprising parts of a single context. Data may be coordinated for a request or a response. For example, the data to be coordinated can be all the data that is needed to make a request, or the data to be coordinated can be all the data needed to respond to a request.

The coordination manager 160 may be connected to a database 162 for storing data to be coordinated. When data to be coordinated (i.e., partial data) is received by the coordination manager 160, the partial data may be stored in the database 162. Also, partial data may be retrieved from the database 162 and then coordinated with newly received other data.

The coordination manager 160 may include one or more servers. A computer program for coordinating messages may be stored and executed on the one or more servers. The coordination manager 160 is not limited to servers and may include other computing devices having one or more processors.

An example of coordinating data is as follows. A user desires to locate a restaurant by asking for directions from a current location via a wireless device (e.g., a cellular phone, which may be user device 110a). In doing so, data about his current location must eventually become part of the request. Thus, if the user is speaking through his phone to the system 100 and says "I'd like directions to a restaurant within 10 miles of my current location", the user is only providing a partial request, which is transmitted to the coordination manager 160 through a channel. In addition, data supplied by the user's GPS device, for instance, provides the remainder of the necessary data (i.e., the device's, and hence, the user's location), which is transmitted to the coordination manager 160 through another channel. In another example, the user may point to a restaurant destination on a touch-sensitive monitor in his car. The destination information may then be transmitted to the coordination manager 160 through yet another channel.

The coordination manager 160 may receive the first request from the cellular phone (e.g., 110a). Before transmitting the request to an application server (e.g., application server 120a) that can provide the requested data, the coordination manager 160 waits until all the data for the request (e.g., the GPS information or the destination information provided separately via the car monitor) is received and compiled. Partial request data may be stored by the coordination manager 160 in the database 162 until all request data is received. After all request data is received and compiled, the coordination manager 160 transmits the request to the application server 120a.

The data that is coordinated by the coordination manager 160 need not be provided from a user device. Some or all the data may be provided from other sources. For example, the user may have user preferences, such as preferring a particular type of food, stored on a server (e.g., application server 120b) connected to the MMS 130. The application server 120b may transmit the user's restaurant-related preferences to the coordination manager 160.

The coordination manager 160 waits until this information is received, as well as the user's location, etc., such that all the request data may be transmitted to the application server 120a using, for example, a single message.

Data parts may be compiled, that is combined into a single coordinated data message and then transmitted to one or more destinations. The data may be transmitted over a network using a protocol established beforehand between the two systems.

The coordination manager 160 can coordinate data being transmitted to a user's device on one or more channels. For example, in response to a user's request to order a list of books, a number of application servers may need to be contacted to establish the availability of each book. The coordination manager 160 coordinates all the responses from all the application servers into a single response to present to the user over any number of channels.

It will be apparent to one of ordinary skill in the art that these examples are provided by way of illustration and not of limitation. In addition, the coordination manager 160 may coordinate data received from one or more sources on one or more channels. Furthermore, the coordinated data may be transmitted to one or more destinations on one or more channels. The coordinated data may include requests for data or responses to requests for data or other messages.

The coordination manager 160 may coordinate data based upon a variety of techniques that are largely implementation dependent. In one embodiment, message header information may identify that data contained in the message's body is only part of a request and is to be coordinated. For example, the data received from the user's cellular phone may include a header that indicates that the contained data is the position information that is to be coordinated with the user's request for directions (from the user's current location). In another embodiment, an extensible markup language (XML) document containing a partial request, perhaps corresponding to an XML document type definition (DTD) or Schema, may include information that identifies the data (e.g., source and requested information expected from the source) to be coordinated.

Other coordination techniques known to one of ordinary skill in the art may be implemented without departing from the spirit and scope of the invention. Furthermore, using header information, information in the XML document or other techniques, the coordination manager 160 may determine whether received data needs to be coordinated or whether specific data comprises a complete request that does not need to be coordinated.

Figure 2:
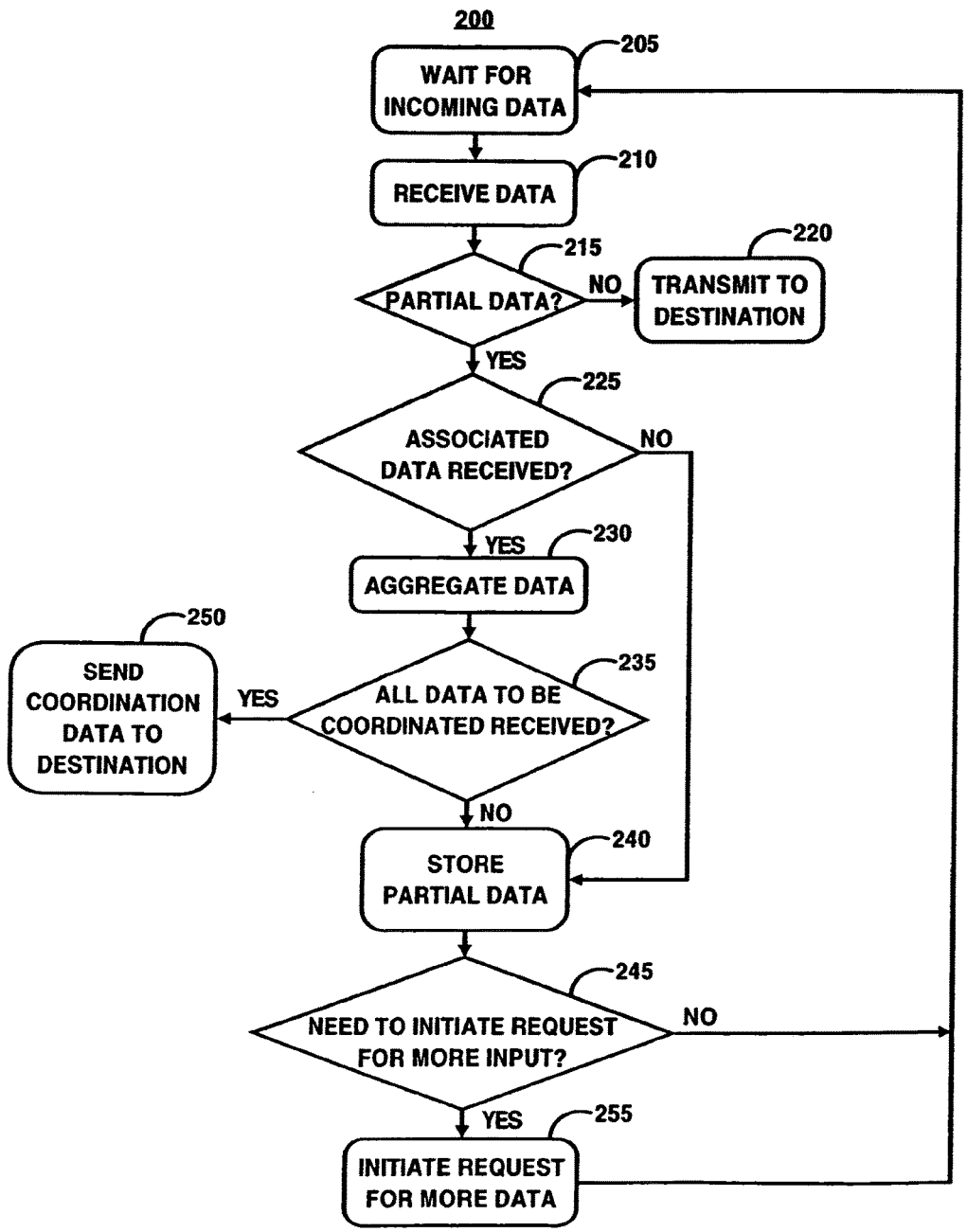
FIG. 2 illustrates a flow chart of an exemplary method according to an embodiment of the invention.

FIG. 2 illustrates an exemplary method 200 according to an embodiment of the invention. In step 205, the coordination manager 160 waits for incoming data. In step 210, the coordination manager 160 receives data.

In step 215, the coordination manager 160 determines whether the received data is partial data (i.e., data to be coordinated with other data). This determination may be performed, for example, using XML document requests, DTDs and/or header information. Partial data may eventually be coordinated with other associated partial data.

In step 220, if the received data is not partial data, the data is transmitted to a destination, such as a user device (e.g., user device 110a), an application server (e.g., application server 120a), etc. In step 225, if the received data is partial data, the coordination manager 160 determines whether associated data (i.e., any other partial data to be coordinated with the data received in step 210) has been received by the coordination manager 160. For example, the coordination manager 160 stores partial data in the database 162. The coordination manager 160 determines whether associated partial data is stored in the database 162.

In step 230, if associated data has been received, the coordination manager 160 aggregates the partial data received in step 210 with the associated data, for example, after the associated data has been retrieved from the database 162. This process continues iteratively as described below.

In step 240, if associate data has not been received (as determined in step 225), the partial data is stored in the database 162 and associated data subsequently received is eventually aggregated with the stored partial data. The aggregated data may also be stored in the database 162.

After the partial data is aggregated in step 230, the coordination manager determines whether all the partial data to be coordinated has been received (step 235). This determination may be performed, for example, using XML document requests, DTDs and/or header information.

If all the data to be coordinated has been received, the coordination manager 160 sends the coordinated data to its destination(s) (step 250). If all the data to be coordinated has not been received, the coordination manager 160 stores the partial data received in step 210 in the database (step 240). Then, the coordination manager 160 determines whether a request for more partial data should be initiated (step 245). For example, a certain data state may be associated with a need to request more data from specific source(s). If the coordination manager 160 detects the data state, it requests data from one or more sources.

If the coordination manager 160 determines that a request should be initiated, the request is initiated (step 255). The coordination manager 160 generates the request and transmits the request to a content provider or other destination that can provide the requested information. Then, the coordination manager 160 waits for incoming data. If a request need not be initiated, as determined in step 245, the coordination manager 160 waits for further incoming data.

The method 200 can be performed by a computer program. That is, the steps performed by the coordination manager 160 can be performed by a computer program. The computer program can exist in a variety of forms both active and inactive. For example, the computer program and objects can exist as software comprised of program instructions or statements in source code, object code, executable code or other formats; or firmware program(s). Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), FFPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method for electronically coordinating data from one or more sources, the method comprising:
   receiving, at a coordination manager via a network from a user device, a user's spoken request for information, the spoken request for information comprising parts of complete data to form a complete request;
   identifying, by the coordination manager, whether the received data is partial data or complete data to form the complete request;
   responsive to identifying that the received data is complete data, transmitting the received data to an application server; and
   responsive to identifying that the received data is partial data:
   storing the received data that is identified as partial data;
   detecting a data state that indicates a need for a request for data associated with the parts of complete data received in the spoken request;
   initiating, by the coordination manager, based on the detected data state, the request for data associated with the parts of complete data received in the spoken request;
   receiving by the coordination manager, the requested data associated with the parts of complete data received in the spoken request; and
   compiling, by the coordination manager, the stored partial data and the data associated with the parts of complete data received in the spoken request to form the complete request.

2. The method of claim 1, wherein the complete request comprises a request for data that is to be used to service the user's spoken request for information.

3. The method of claim 1, wherein the complete request comprises an electronically presentable data message corresponding to the user's spoken request for information.

4. A method for coordinating data from one or more sources, the method comprising steps of:
   receiving at a coordination manager over a network from a user device, a user's spoken words requesting content data, the request comprising parts of complete data to form a complete request;
   identifying, by the coordination manager, based on header information of the received request, whether the received request is partial data or complete data to form the complete request;
   responsive to identifying that the received request is complete data, transmitting the received request to an application server;
   responsive to identifying that the received request is partial data:
   storing the parts of the complete data to form the complete request;
   identifying, by the coordination manager, data associated with the parts of the complete data that is to be compiled therewith to form the complete request; and
   compiling, by the coordination manager, the stored parts of the complete data and the identified data associated with the parts of the complete data to form the complete request which is the request for content data.

5. The method of claim 4, wherein the coordination manager comprises a plurality of servers.

6. The method of claim 4, wherein the identified data associated with the parts of the complete data is received at the coordination manager before the partial data is received.

7. The method of claim 4, wherein the identified data associated with the parts of the complete data is sent from the user device.

8. The method of claim 4, wherein the identified data associated with the parts of the complete data is stored on a server.

9. The method of claim 4, further comprising:
establishing that not all data needed to compile into the complete request has been received, and
initiating a request for the remaining data.

10. The method of claim 4, wherein the complete request is transmitted over a network to the application server.

11. The method of claim 4, wherein the identified data associated with the parts of the complete data is in the form of text.

12. The method of claim 4, wherein the identified data associated with the parts of the complete data is received at the coordination manager from the user device after the parts of the complete data are received.

13. The method of claim 4, wherein the identified data associated with the parts of the complete data is received at the coordination manager from another user device.

14. The method of claim 4, further comprising, transmitting an electronically presentable response to the request for content data.

15. A system for electronically coordinating data from one or more sources, the system comprising:
a user device; and
a coordination manager configured to:
receive, over a network, from the user device, a user's spoken request for information, the spoken request for information comprising parts of complete data to form a complete request;
identify whether the received data is partial data or complete data to form the complete request;
responsive to identifying that the received data is complete data, transmit the received data to an application server; and
responsive to identifying that the received data is partial data:
store the received parts of the complete data;
detecting a data state that indicates a need for a request for associated data;
initiate the request for associated data based on the detected data state;
receive the requested associated data; and
compile the stored parts of the complete data and the associated data to form the complete request.

16. The system of claim 15, wherein the complete request comprises a request for data that is to be used in electronically servicing the user's spoken request for information.

17. The system of claim 15, wherein the complete request comprises an electronically presentable data message corresponding to the user's spoken request for information.

18. A non-transitory computer-readable medium that stores instructions that, in response to execution, cause a processor to perform or control performance of operations comprising:
receiving at a coordination manager over a network from a user device, a user's spoken words requesting content data, the request comprising parts of complete data to form a complete request;
identifying, by the coordination manager, whether the received data as being partial data or complete data to form the complete request;
responsive to identifying that the received data is complete data, transmitting the received request to an application server; and
responsive to identifying that the received data is partial data:
detecting, by the coordination manager, a data state that indicates a need for a request for data associated with the parts of complete data received in the spoken request;
initiating, by the coordination manager, based on the detected data state, the request for data associated with the parts of complete data received in the spoken request;
receiving, by the coordination manager, the requested data associated with the parts of complete data received in the spoken request; and
compiling, by the coordination manager, the parts of complete data and the associated data to form the complete request which is the request for content data.

19. The non-transitory computer-readable medium of claim 18, wherein the complete request comprises a request for data that is to be used to service the user's spoken request for information.

20. The non-transitory computer-readable medium of claim 18, wherein the complete request comprises an electronically presentable data message corresponding to the user's spoken request for information.

* * * * *